United States Patent [19]

Kenny et al.

[11] Patent Number: 4,569,425

[45] Date of Patent: Feb. 11, 1986

[54] VEHICULAR ENGINE IDLE SPEED AND CRUISE CONTROL SYSTEM

[75] Inventors: Andrew A. Kenny, Roselle; Robert G. Sokalski, Wheaton, both of Ill.

[73] Assignee: Eaton Corporation, Cleveland, Ohio

[21] Appl. No.: 584,077

[22] Filed: Feb. 27, 1984

[51] Int. Cl.⁴ .............................................. B60K 41/21
[52] U.S. Cl. .................... 192/3 T; 192/3 S; 123/339
[58] Field of Search ...................... 192/3 M, 3 S, 3 T; 123/339, 352, 376; 180/178, 179

[56] References Cited

U.S. PATENT DOCUMENTS

| | | | |
|---|---|---|---|
| 3,204,734 | 9/1965 | McMaken | 192/3 T |
| 3,476,204 | 11/1969 | Westby et al. | 192/3 R X |
| 4,120,373 | 10/1978 | Fleischer | 180/179 |
| 4,132,284 | 1/1979 | Tomecek | 180/179 |
| 4,408,293 | 10/1983 | Avins | 180/179 |
| 4,408,581 | 10/1983 | Pfalzgraf et al. | 123/339 |
| 4,412,518 | 11/1983 | Kenny | 123/339 |

Primary Examiner—William F. Pate, III
Assistant Examiner—James J. Merek
Attorney, Agent, or Firm—C. H. Grace; A. E. Chrow

[57] ABSTRACT

Disclosed is a system for controlling both cruising speed and engine idling speed of a vehicle. The system includes an electronic control module that controls an actuator (100) having a moveable member preferably in the form of a gear rack (6) that is pivotably mounted to an intermediate member (8) that is operably connected to the engine throttle and adapted to move in opposite directions along a frame (2) of the actuator. The actuator is provided with means, preferably in the form of an idle speed control switch (34), for sensing when the throttle is being controlled by the operator and causing the control module to switch its output from a second control signal to a first control signal and feedback means, preferably in the form of a differentiating switch (47), for determining an idle speed pick-up position for the moveable member that is more than the desired regulated engine idle speed position but not more than the operator selected cruising speed position.

27 Claims, 6 Drawing Figures

VEHICULAR ENGINE IDLE SPEED AND CRUISE CONTROL SYSTEM

INTRODUCTION

This invention relates to a system and an actuator used with such system that enables the operator of a motor vehicle to set and maintain a desired vehicle speed without the need for modifying the accelerator position as power demands upon the engine vary and also enables the accelerator to seek and maintain a desired engine idling speed independent of the vehicle speed.

BACKGROUND OF THE INVENTION

Many devices have been developed over the years to enable the operator of a motor vehicle to set and maintain a desired cruising (road or vehicle) speed. Some of the devices have involved fluid or electro-mechanical mechanisms connected to the engine to sense engine speed and to modify the engine throttle setting to maintain the speed at a level desired by the operator. Other devices have been utilized to directly control throttle setting rather than a predetermined engine speed. By way of example, a device that proports to sense and maintain engine speed is disclosed in U.S. Pat. No. 3,476,204, the disclosure of which is incorporated herein by reference. An example of a device that proports to maintain a desired throttle setting is disclosed in U.S. Pat. No. 3,204,734, the disclosure of which is incorporated herein by reference.

Devices have also been utilized in the past that regulate the accelerator position by balancing a potentiometer to the voltage derived from the engine ignition system at the particular engine speed occuring at the vehicle speed desired. The complexity in adjusting such devices is proportedly diminished by the cruise control system disclosed in U.S. Pat. No. 4,132,284, the disclosure of which is incorporated herein by reference, by employment of an electronic control system that drives an electrical system having a voltage that is proportional to the instantaneous speed and independent of the amplitude of the engine ignition impulses. The system, however, employs a complex mechanical arrangement that requires the pivotal mounting of an electrical motor that is rotated in opposite directions by a solenoid to engage and disengage a gear that is connected to the acceleration pedal by a flexible cable.

Although all of the previously described devices in one form or another use engine speed or an accelerator position by seek and maintain a desired pre-set vehicle speed by the operator, they have been complicated and costly to manufacture and to install and have been unable to regulate both vehicle speed and engine idling speed.

The problem of maintaining a desired engine idling speed is often as desirable as maintaining an operator selected vehicle cruising speed in order to insure optimum engine operating conditions as well as minimizing fuel consumption and smoothness of performance. Engine idle speed control systems commonly derive their control from a variety of sensed engine conditions such as desired accelerator position, desired engine rpm, engine temperature, coolant temperature and atmospheric conditions. An example of an idle speed control system that is able to integrate engine speed with a variety of additional sensed engine conditions to control engine idling speed is disclosed in my U.S. Pat. No. 4,412,518 which is assigned to the assignee of the present invention and, the disclosure of which, is incorporated herein by reference. Understandably, use of separate mechanisms to control cruising speed and engine idling speed is expensive and costly and compounds installation and maintenance costs and expenses.

In view of the above, a need exists to provide a system that not only is able to regulate vehicle speed in a simple and economical manner but is also able to regulate engine idling speed without the cost and expense of having to install separate systems for both which has heretofore been the practice in the past.

SUMMARY OF THE INVENTION

Accordingly, it is an object of this invention to provide a system for regulating both vehicle speed and engine idling speed at independently desired conditions.

It is another object of this invention to provide a combined cruise and engine idling speed control system that is less costly to install and maintain than separate systems heretofore used for such purposes in the past.

It is still another object of this invention to provide a system that is able to regulate both vehicle speed and engine idling speed at operator selected conditions whereby the engine idling speed is regulated independently of the vehicle speed.

It is yet another object of this invention to provide an actuator that, in response to certain control signals, is able to regulate both vehicle speed and engine idling speed.

It is yet a further object of this invention to provide a two-switch force responsive arrangement by which the particular modes of a vehicle utilizing an actuator adapted to regulate both vehicle speed and engine idling speed is established.

DESCRIPTION OF SOME PREFERRED EMBODIMENTS

Figure 1A:
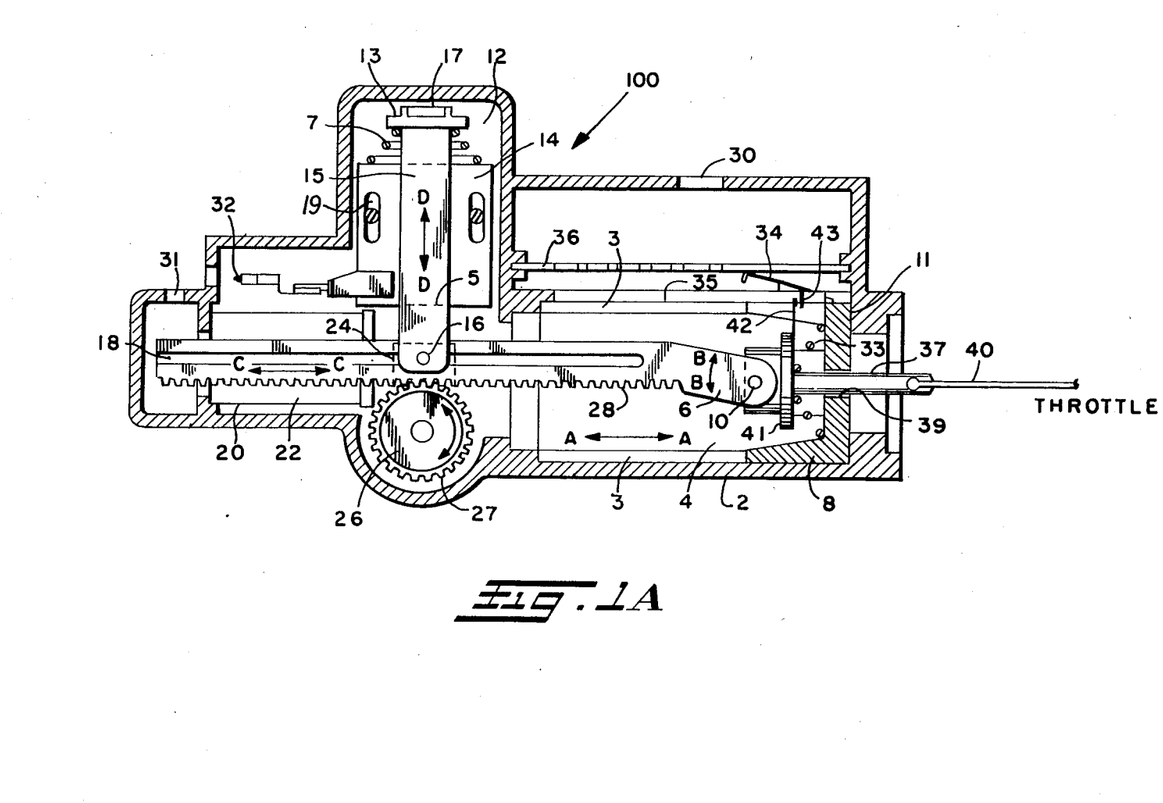
FIG. 1A shows a cross-sectional side elevation view of an embodiment of an actuator that is particularly preferred for use with the control system of the invention.

FIG. 1A shows an embodiment of an actuator 100 that is particularly preferred for use in conjunction with the control system of the invention. Actuator 100 provides a means of regulating engine idling speed independently of vehicle speed as hereinafter described.

Actuator 100 has a support member 2 that is secured against movement with respect to the vehicle engine and the throttle. Member 2 may be made from any material suitable for the particular vehicular application for which it is to be used.

Member 2 has a chamber 4 therewithin in which is disposed members 6 and 8. The relationship between members 6 and 8 and solenoid 14 hereinafter described is illustrated perspectively in FIG. 1B for clarity. Member 6 is a gear rack and member 8 is an intermediate member that is slidably engaged with member 2 and able to move in opposite directions along groove 3 in member 2 as shown by arrows A—A in FIG. 1A. Gear rack 6 is pivotably mounted to member 8 by pin 10 and able to rotate in opposite directions with respect to member 8 as shown by arrows B—B in FIG. 1A. Gear rack 6 likewise moves in opposite directions along member 2 in conjunction with the movement of member 8 as shown by arrows C—C in FIG. 1A.

Member 2 also has a chamber 12 therewithin which communicates with chamber 4 and in which is disposed solenoid 14 that is preferably moveably secured to member 2 by means of slots 19 so that it can be moved reciprocally in opposite directions along the longitudinal axis of slots 19 for purposes of calibration as hereinafter described. Solenoid 14 has a moveable core member 17 that moves reciprocally in opposite directions as shown by arrows D—D in FIGS. 1A in response to energization and de-energization of solenoid 14. Solenoid 14 is operatively connected to gear rack 6 by means of a yoke 15 that is secured at one end to member 17 and at the opposite end to gear rack 6 by pin 16 that is slidably engaged in groove 18 that extends along the side of gear rack 6 as shown in FIG. 1A. The body of solenoid 14 is held firmly within yoke 15 by means of coiled spring 7 which urges solenoid 14 against shoulder 5 of yoke 15 as shown in FIG. 1A. Gear rack 6 is able to slide in opposite directions past pin 16 and energization and de-energization of solenoid 14 causes member 17 to move yoke 15 in opposite directions in a direction substantially transverse to the longitudinal axis of gear rack 6 and cause pin 16 to rotate gear rack 6 in opposite directions about pin 10 by pressing against opposite facing side walls of groove 18. As previously described, the position of gear rack 6 can be calibrated by moving solenoid 14 in opposite directions along the longitudinal axis of slots 19 so that the angular position of gear rack 6 with respect to pin 10 can be adjusted as required. Alternatively, gear rack 6 may have only one groove 18 extending along one side thereof or may have corresponding grooves in opposite sides of gear rack 6 or may, instead of having such grooves, have an elongate opening through gear rack 6 extending therealong to which yoke 15 suitably slidably secured in order to rotate gear rack 6 in opposite directions about pin 10 without interferring with movement of rack 6 in opposite directions along member 2 as previously described. Although preferably secured to gear rack 6 by means of yoke 15, it is to be understood that solenoid 14 may be connected to gear rack 6 in any manner that enables gear rack 6 to slide in opposite directions along member 2 and also rotate about pin 10 in opposite directions in response to energization and de-energization of solenoid 14. Like member 2, gear rack 6 and intermediate member 8 may be made from any material suitable for the vehicular application in question.

Also enclosed by member 2 is chamber 20 that communicates with chambers 4 and 12 as shown in FIG. 1A. Bi-directional motor 22 is secured to member 2 within chamber 20 by suitable means. Motor 22 rotates gear 24 which in turn rotates gear 26 in opposite directions accordingly to the particular electrical signal received by the servo component of motor 22 which in turn causes gear rack 6 and member 8 to move in opposite directions along member 2 when teeth 27 become intermeshed with teeth 28 of gear rack 6 when gear rack 6 is in the engaged position shown in FIG. 1A. Although preferably driven by gear train gears 24 and 26, as shown in FIG. 1A, it is to be understood that any pinion, worm or other type of operative connection between motor 22 and gear rack 6 that is able to move rack 6 in opposite directions in response to opposite directional rotation of the motor shaft is considered within the scope of the invention. Motor 22 is preferably a bi-directional D.C. motor well known to those skilled in the art that is able rotate in either a clockwise or counterclockwise direction according to the electrical signal received by the servo motor.

Figure 1B:
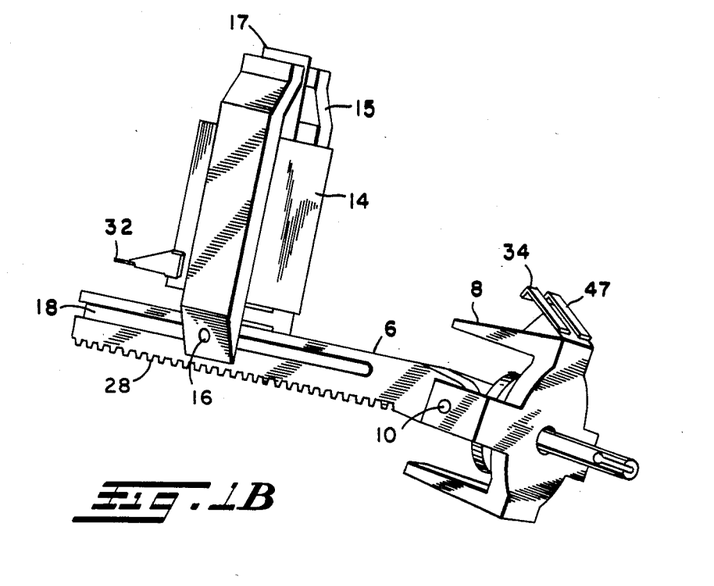
FIG. 1B shows a perspective view of certain components of the actuator of FIG. 1A.

Member 2 is provided with suitable openings 30, 31 to enable connection of electrical circuitry hereinafter described. Solenoid 14 is provided with a suitable electrical connector 32 for enabling solenoid 14 to receive an electrical signal initiated by the operator control means. Idle control switch means 34 is secured to member 8 in such a manner as to maintain electrical contact with electrical tracking strip 36 secured to support 2 as shown in FIG. 1A. Strip 36 provides the electrical surface contact by which control switch 34 is able to monitor the position of members 6 and 8 with respect to member 2 in regulating both vehicle speed and engine idling speed throttle position as is well known in the art. As shown in FIG. 1B, a feedback switch means 47 is also secured to member 8. Switch 47 contacts a separate electrical tracking strip 36' (shown in FIG. 4) that is secured to member 2 to provide a feedback signal that determines a high or pick-up engine idle speed actuator position by means of a potentiometer and causes rack 6 to automatically move to the pick-up idle position whenever the accelerator is being controlled by the operator.

Gear rack 6 and member 8 are preferably operatively connected to the throttle by resilient connection means comprising coiled spring 33 and moveable member 37 which extends from chamber 4 through opening 39 in member 8 and connects to one end of flexible cable 40 which is connected at its opposite end to the throttle as shown in FIG. 1A. Spring 33 is secured to member 8 and shoulder 41 of member 37 as shown in FIG. 1A. Acceleration of the throttle by the operator causes cable 40 to move member 37 toward the viewer's left causing spring 33 to stretch. When the operator releases his foot from the accelerator pedal and actuator 100 is engaged, spring 33 urges member 37 back toward the viewer's right to the position shown in FIG. 1A.

Electrical contacts 42 and 43 associated with control switch 34 are respectively secured to shoulder 41 and contact 34 of member 8 as shown in FIG. 1A so that they close and contact each other when actuator 100 is operating the throttle and move away from each other and open when the operator presses his foot on the accelerator pedal. The arrangement of the contact and the manner in which the pedal is connected to the accelerator can of course be changed so that the opening and closing of the contacts is reversed. The resilient connection between member 8 and the throttle in conjunction with contacts 42 and 43 provide a means of signaling when actuator 100 is under operator control and when it is itself controlling as hereinafter described.

Flexible cable 40 may be any suitable flexible cable including the type well known to those skilled in the art that features the cable slidably disposed within an outer jacket that is secured against movement with respect to the throttle.

Figure 2:
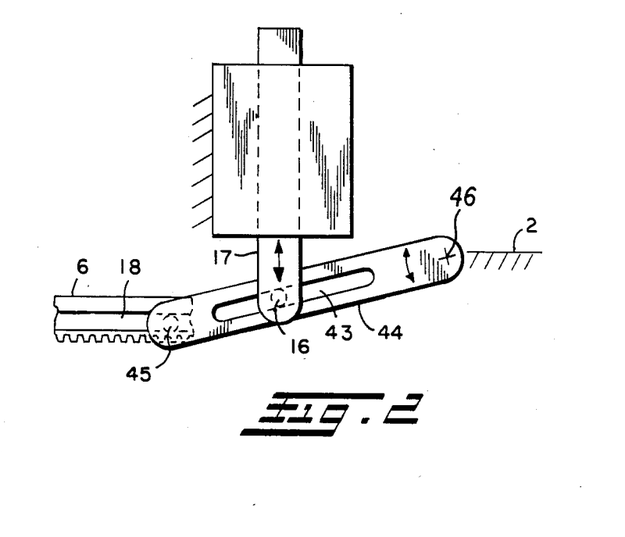
FIG. 2 shows a side elevation view of an alternate embodiment of certain components of the actuator of FIG. 1A.

FIG. 2 shows an alternate embodiment of certain components within actuator 100 of FIGS. 1A and 1B where an intermediate cam member 44 is included between solenoid 14 and gear rack 6. Cam 44 is pivotably mounted at one end to member 2 by pin 46. In FIG. 2, solenoid 14 is fixedly secured to member 2 and member 17 is moveably secured in elongate opening 43 of cam 44 by pin 16. The opposite end of cam 44 is moveably secured in groove 18 of gear rack 6 by pin 45. Energization and de-energization of solenoid 14 by the operator causes member 17 to move in opposite directions as shown by the arrows which in turn causes cam 44 to rotate in opposite directions about pin 46 which in turn causes pin 45 to rotate gear rack 6 in opposite directions about pin 10 as previously described. Energization or de-energization of solenoid 14 causes member 17 to move reciprocally in opposite directions and cause pin 16 to press against opposite sides of elongate opening 43 in cam 44 and rotate cam 44 about pivot 46 which in turn causes pin 45 secured to the opposite end of cam 44 to press against opposite side walls of groove 18 in gear rack and rotate gear rack 6 to effect its engagement and disengagement from gear 26. It is to be understood, however, as previously described, that any suitable means by which to rotate gear rack 6 to the extent necessary to enable it to engage and disengage with motor 22 is considered within the scope of the invention. For example, member 17 of solenoid 14 may be oriented in any direction and either directly, or indirectly, by means of a cam or the like, cause gear rack 6 to rotate about pin 10 to effect the engagement and disengagement between gear rack 6 and motor 22.

Figure 3:
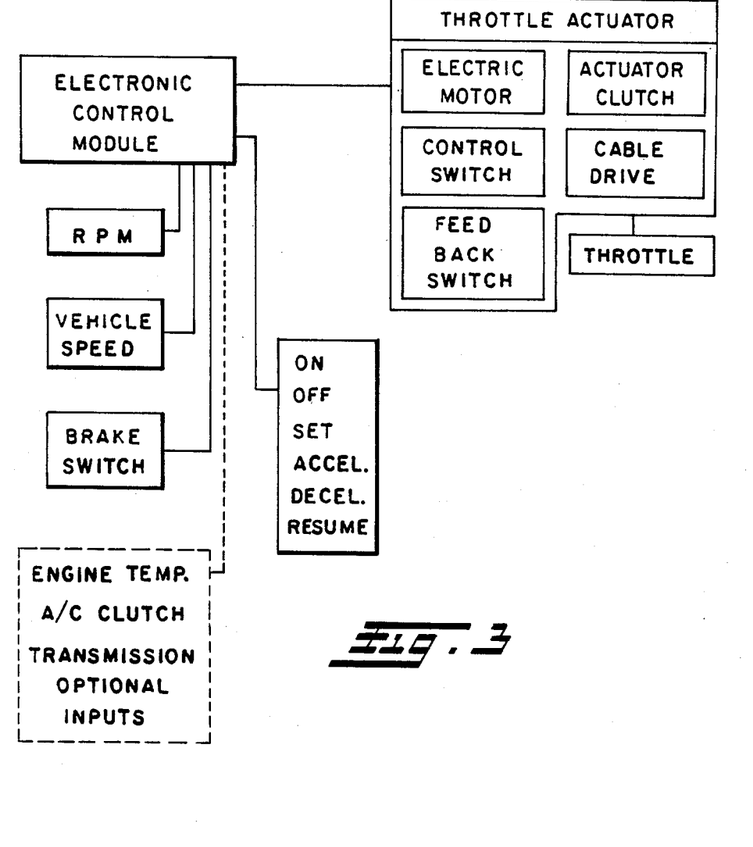
FIG. 3 shows a schematic block diagram including the relationship between the controller means and actuator means of the control system of the invention.
Figure 5:
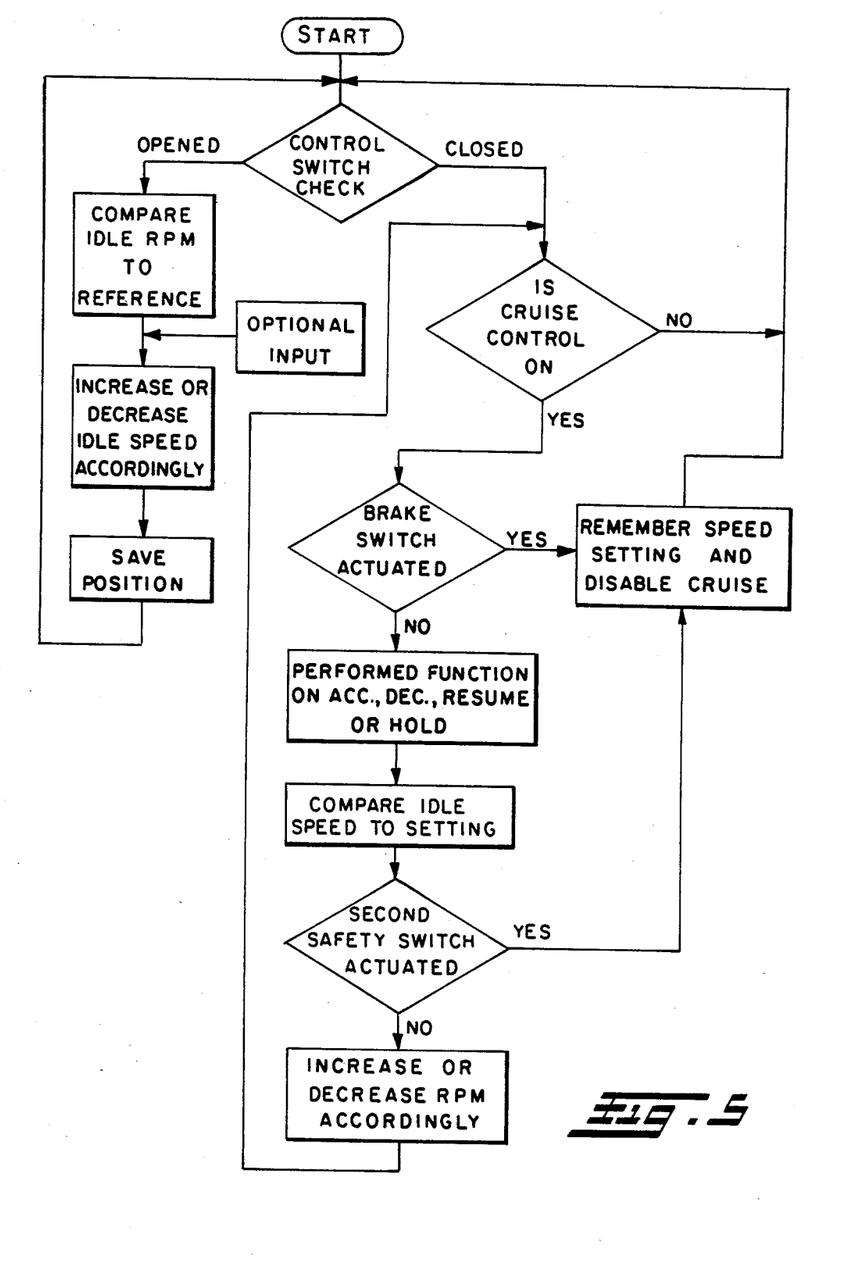
FIG. 5 shows a schematic block diagram showing the logic associated with the control system of the invention.

The relationship between the electronic control module (controller means) and actuator 100 is shown in block diagram form in FIG. 3 and the logic for regulating both vehicle ground speed and engine idling speed is shown in block diagram form in FIG. 5.

The electronic control module of FIG. 3 receives a variety of input information signals such as engine rpm, vehicle speed, engine temperature, brake switch condition, and other optional inputs and includes an "on-off" switch and ground speed "set" selector as well as information as to whether the operator is accelerating or decelerating and preferably includes a "resume" capability which enables return to a pre-selected ground speed after having decelerated the vehicle below the speed selected.

The electronic control module provides actuator 100 with a first control signal causing actuator 100 to regulate vehicle speed at an operator selected level when gear rack 6 and gear 26 are in a first engaged condition and provides a second control signal causing actuator 100 to regulate engine idling speed when gear rack 6 and gear 26 are in a second engaged condition. Whether gear 26 and gear rack 6 are in the first or second engaged condition is determined by the condition of a brake switch or other suitable switch operated, directly or indirectly, by the operator. The manner in which motor 22 moves gear rack 6 in the first engaged cruise control condition may be the same as or different from the manner in which motor 22 moves gear rack 6 in the second engine idling speed engaged condition by the particular circuitry that is called into play upon establishment of the particular engaged condition between the two. Thus, the circuitry may be such that motor 22 is able to move gear rack 6 in gross or vernier amounts when actuator 100 is in the second idle speed engaged condition and only in vernier amounts when in the cruise control first engaged condition.

In operation, with the cruise turned on, gear 26 and gear rack 6 are in the first engaged condition with the control module providing a first control signal that enables actuator 100 to regulate vehicle ground speed at a speed selected by the operator. When the operator applies the brake, the brake switch is actuated, as shown in FIG. 5, which in turn provides a signal to solenoid 14 causing solenoid 14 to momentarily disengage gear 26 from gear rack 6 and then re-engage the two to establish a second engaged condition at which the control module provides a second control signal causing actuator 100 to regulate engine idling speed while insuring that the direction of rotation of the motor is such as to move gear rack 6 in a direction from the pick-up idle speed position towards the regulated engine idling speed position of gear rack 6 and member 8 desired. Of course, separate switches actuated by the operator may be used of which one causes actuator 100 to change from the first (cruise) engaged condition to the second (engine idle speed) engaged condition and the other assures that the motor is rotating in a direction as to slow the engine rpm down in moving from the pick-up engine idle speed position to the regulated engine idle speed position.

Figure 4:
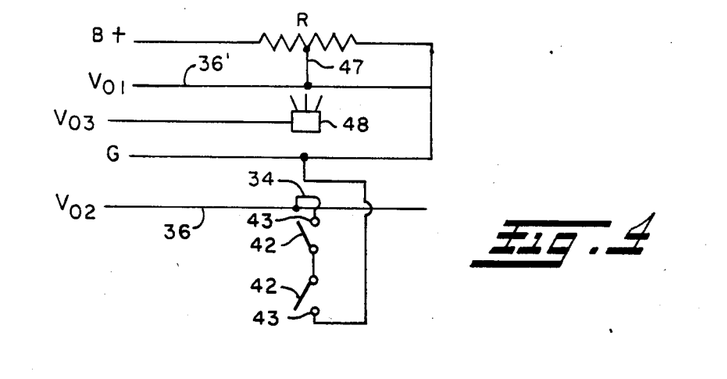
FIG. 4 shows schematic circuitry arrangement of a control switch and potentiometric feedback switch of the control system of the invention.

In order to provide a smooth transition from a higher operator selected vehicle speed throttle position to a lower regulated engine idle speed throttle position, feedback switch such as a potentiometric switch 47 shown in FIGS. 1B and 4 differentiates between the operator selected ground speed throttle position and the regulated engine idling speed throttle position and proportionates, for example in terms of voltage, to establish a idle speed pick-up position of members 6 and 8 that is more than the engine idle speed position and not more than the operator selected vehicle speed position and then causes the control module to cause motor 22 to move members 6 and 8 along member 2 to position members 6 and 8 at the determined engine idling speed pick-up position from which the engine speed is then caused to decrease in a uniform manner down to the regulated engine idling speed position of members 6 and 8.

Actuation of the throttle by the operator is sensed by control switch 34 by the opening of contacts 42 and 43 which signals the controller module to switch its output from the second control signal regulating engine idling speed to the first control signal regulating vehicle speed. When in the cruise mode, the operator steps on the brakes and actuates the brake switch, actuator 100 changes from the first engaged condition as previously described while the feedback differentiating switch 47 causes actuator 100 to position members 6 and 8 at the engine idle speed pick-up position and the brake switch or other operator controlled switch means assures that motor 22 is rotating in a direction that enables the engine speed to slow down in a uniform manner from the speed at the idle speed pick-up position to the regulated engine idle speed position as previously described.

The relationship between control switch 34 and feedback switch 47 is shown in FIG. 4. In FIG. 4, control switch 34 is in electrical contact with tracking strip 36 as previously described. Strip 36 has an electrical potential $VO_2$. Feedback switch 47 is in electrical contact with tracking strip 36' as previously described. Switch 47 feeds back a proportionate voltage or other suitable electrical unit by contacting potentiometer R having a base voltage of B+ in the manner shown in FIG. 4. An alternative arrangement such as sensing switch 48 can be used in place of potentiometric feedback switch 47 if desired. Switch 48 senses the cruise position of members 6 and 8 and by suitable proportionating or other means causes members 6 and 8 to move to the pick-up idle speed position which, as previously described, is higher than the desired regulated engine idle speed position but not more than the cruise position.

By way of illustration and further explanation, the use of a two switch force responsive arrangement for determining the mode of the vehicle is shown in following truth Table I in terms of the relationship between the first idle control switch 34 and second feedback switch 47 condition, the actuator (members 6 and 8) position, and the direction of force on the throttle.

Assuming that actuation of the throttle by the operator creates a force on the throttle in one direction that is less than zero and, that when the actuator is controlling a force is exerted on the throttle in the opposite direction that is greater than zero, and that the first and second switches are adapted to the accelerator so they open and close in the manner indicated, the following relationships would exist:

TABLE I

| Vehicle Mode | Actuator Position | Force on Throttle | Idle Control Switch | Feed-Back Switch | Throttle Position |
| --- | --- | --- | --- | --- | --- |
| idle | idle | >0 | closed | open | idle |
| idle | pick-up idle | >0 | closed | closed | pick-up idle |
| operator | idle | <0 | open | open | idle |
| operator | pick-up idle | <0 | open | closed | pick-up idle |
| operator | pick-up idle | <0 | open | closed | cruise |
| cruise | cruise | >0 | closed | closed | cruise |

Understandably, first idle control selector 34 and second feedback switch 47 may be adapted to the actuator to provide open and closed combinations reverse to those indicated in above Table I. It is to be understood that means other than idle speed control switch 34 may be used to sense when the throttle is being actuated by the operator to cause the controller to provide the second idle speed control signal and means other than potentiometric feedback switch 47 may be used to determine the engine idle speed pick-up position to which the actuator is automatically taken whenever the throttle is under operator control.

What is claimed is:

1. A vehicular cruise and engine idling speed control system comprising:
   actuator means, said means adapted for engagement to a vehicular engine throttle that in a first engaged condition is operable upon receipt of a first control signal to move the throttle to regulate the vehicle speed and that in a second engaged condition is operable upon receipt of a second control signal to regulate engine idling speed independent of the vehicle speed,
   controller means responsive to sensed vehicle speed and an operator selected vehicle speed to provide said first control signal and further operative to provide said second control signal from at least one sensed engine operating condition upon establishment of said second engaged condition,
   operator controlled means for establishment of said first and said second engaged conditions,
   means sensing throttle actuation by the operator and functionally effective for switching said controller means output from said second control signal to said first control signal and causing the actuator to position the throttle at an advanced engine idle speed pick-up position,
   means for differentiating between the operator selected vehicle speed throttle position and the regulated engine idle speed pick-up throttle position and for insuring that the engine idle speed pick-up throttle position is not more than the operator selected vehicle speed throttle position and more than the regulated engine idle speed throttle position, and
   means for insuring that the engine speed decreases in a uniform manner from the engine idle speed pick-up throttle position to the regulated engine idle speed throttle position.

2. The system of claim 1 wherein the actuator means comprises a bi-directional motor that is secured against movement with respect to the throttle that in the first engaged condition is operable to rotate at least one gear operably engaged with the throttle and to move the throttle to regulate the vehicle speed in response to receipt by the motor of the first control signal and that upon establishment of the second engaged condition is operable to rotate the gear and cause the throttle to regulate the engine idling speed independent of the vehicle speed in response to receipt by the motor of the second control signal.

3. The system of claim 2 wherein the gear is operably engaged with the throttle by means of a gear rack moveably engaged with a support member that is secured against movement with respect to the throttle, said gear rack having teeth engageable with teeth on the gear rotated by the motor when the actuator is in the first and second engaged conditions.

4. The system of claim 3 wherein the gear rack is moveably engaged with the support member by means of an intermediate member disposed therebetween, said intermediate member operably connected to the throttle and slidably engaged with the support member and adapted to move in opposite directions therealong, and said gear rack pivotably mounted to the intermediate member in such a manner as to enable the operator controlled means to cause the gear rack to rotate in opposite directions about the pivotal mounting to the extent necessary to enable disengagement and establishment of the first and second engaged conditions.

5. The system of claim 4 including a solenoid operatively connected to the gear rack and adapted to rotate the gear rack in opposite directions about the pivotal mounting the amount necessary to establish the first and second engaged conditions according to whether the solenoid is energized or de-energized by a signal provided by the operator controlled means.

6. The system of claim 5 wherein the solenoid is operatively connected to the gear rack by means of a cam that is adapted to rotate the gear rack in said opposite direction about the pivotal mounting in response to the energization and de-energization of the solenoid.

7. The system of claim 2 wherein the intermediate member is operatively connected to the throttle by a flexible cable.

8. The system of claim 1 wherein the operator controlled means comprises an electrical switch means operative to provide an electrical signal causing the establishment of the second engaged condition upon actuation by the operator.

9. The system of claim 8 wherein the switch means is actuated upon application of a brake by the operator.

10. The system of claim 1 wherein the sensing means comprises electrical idle control switch means, said means operative in response to forces imposed upon the throttle by the operator when the actuator is in said second engaged condition to cause the actuator to advance the throttle to the pick-up engine idle speed position and switch the controller means output from the second control signal to the first control signal.

11. The system of claim 4 wherein the intermediate member is connected to the throttle by resilient means and the sensing means comprises idle control switch means having a contact secured to the moveable member and a contact secured to the resilient connecting means such that movement of the resilient connecting means caused by movement of the throttle by the operator actuates the contacts in such a manner as to cause the controller output to switch from the second control signal to the first control signal while causing the motor means to move the intermediate member and the gear rack to the engine idle-speed pick-up throttle position.

12. The system of claim 1 wherein the means for differentiating between the operator selected vehicle speed throttle position and the engine idle speed pick-up throttle position comprises feedback potentiometric switch means adapted to measure the operator selected vehicle speed throttle position in terms of electrical units and establish the engine idle speed pick-up throttle position as a proportionate thereof that is more than the engine idle speed throttle position and not more than the operator selected vehicle speed throttle position.

13. The system of claim 1 wherein the means for insuring that the actuator moves the throttle in a uniform manner from the idle speed pick-up position to the regulated idle speed position comprises operator controlled switch means which cause the motor to rotate in a direction causing the throttle to move in a uniform manner from the idle speed pick-up position to the regulated idle speed position upon establishment of the second engaged condition.

14. An actuator adapted for connection to a vehicular engine throttle for regulating operator selected vehicle speed and engine idling speed, said actuator comprising;
a support member secured against movement with respect to the throttle,
a bi-directional motor secured to the support member,
a moveable member operably connected to the throttle that in an operator controlled first engaged condition between the motor and the moveable member is operable, upon receipt by the motor of a first control signal, to cause the motor to cause the moveable member to move the throttle to regulate vehicle speed and that in an operator controlled second engaged condition between the motor and the moveable member, is operable, upon receipt by the motor of a second control signal, to cause the motor to cause the moveable member to move the throttle to regulate engine idling speed independent of the vehicle speed,
said actuator provided with means for sensing operator actuation of the throttle when the motor gear and the moveable member are in the second engaged condition and causing the motor to rotate and cause the moveable member to move the throttle to an idle speed pick-up position,
said motor responsive to means for differentiating between the operator selected vehicle speed throttle position and the engine idle speed throttle position and insuring that the engine idle speed pick-up throttle position is not more than the operator selected vehicle speed throttle position and more than the regulated engine idle speed throttle position,
and means for insuring that the moveable member moves the throttle in a uniform manner from the idle speed pick-up position to the regulated idle speed position upon establishment of the second engaged condition.

15. The actuator of claim 13 wherein the moveable member comprises a gear rack that is moveably engaged with the support member, said gear rack having teeth engageable with teeth on a gear that is rotated by the motor when the actuator is in the first and second engaged conditions.

16. The actuator of claim 15 wherein the gear rack is moveably engaged with the support member by means of an intermediate member disposed between the gear rack and the support member, said intermediate member operably connected to the throttle and slidably engaged with the support member and adapted to move in opposite directions therealong, and said gear rack pivotably mounted to the intermediate member in such a manner as to enable the operator controlled means to cause the gear rack to rotate in opposite directions about the pivotal mounting to the extent necessary to establish the first and second engaged conditions between the gear rack and the gear operably rotated by the motor.

17. The actuator of claim 16 including a solenoid operatively connected to the gear rack and adapted to rotate the gear rack in said opposite directions about the pivotal mounting according to whether the solenoid is energized or de-energized by a signal provided by the operator controlled means.

18. The actuator of claim 17 wherein the solenoid is operatively connected to the gear rack by means of a cam that is adapted to rotate the gear rack in said opposite directions about the pivotal mounting in response to the energization and de-energization of the solenoid.

19. The actuator of claim 14 wherein the moveable member is operatively connected to the throttle by a flexible cable.

20. The actuator of claim 14 wherein the operator controlled means comprises an electrical switch means operative to provide an electrical signal causing the establishment of the second engaged condition upon actuation by the operator.

21. The actuator of claim 20 wherein the switch means is actuated upon application of a brake by the operator.

22. The actuator of claim 14 wherein the sensing means comprises idle speed control switch means, said means operative in response to forces imposed on the throttle by the operator when the actuator is in said second engaged condition to cause the actuator to move the throttle to the pick-up idle speed throttle position.

23. The actuator of claim 16 wherein the intermediate member is connected to the throttle by resilient means and the sensing means comprises engine idle control switch means having a contact secured to the intermediate member and a contact secured to the resilient connecting means such that movement of the resilient connecting means caused by movement of the throttle by the operator actuates the contacts in such a manner as to cause the motor to move the intermediate member and the gear rack to the engine idle speed pick-up throttle position.

24. The actuator of claim 14 wherein the means for differentiating between the operator selected ground speed throttle position and the engine idle speed pick-up throttle position comprises a potentiometric feedback switch means adapted to measure the operator selected vehicle speed throttle position in terms of electrical units and establish the engine idle speed pick-up throttle position as a proportionate thereof that is more than the engine idle speed throttle position and not more than the operator selected vehicle speed throttle position.

25. The actuator of claim 14 wherein the means for insuring that the moveable member moves in a uniform manner from the idle speed pick-up position to the regulated idle speed position comprises operator controlled switch means that cause the motor to rotate in a direction causing the moveable member to move uniformly from the idle speed pick-up position to the regulated idle speed position upon establishment of the second engaged condition.

26. A two-switch force responsive arrangement for determining modes of a vehicle according to the position of an actuator that is adapted for connection to a vehicle throttle for regulating vehicular and engine idling speed, said actuator comprising a moveable member operably connected to the throttle that in an operator controlled first engaged condition with at least one gear rotated by a bi-directional motor is operative to regulate the throttle to maintain an operator selected vehicle speed and that in an operator controlled second engaged condition with the gear is operative to set the throttle at an engine idle speed pick-up position from which the engine speed is able to decrease in a uniform manner to the regulated engine idling speed while insuring that the engine idling speed pick-up throttle position is not more than the operator selected vehicle speed throttle position and more than the regulated engine idling speed throttle position, said moveable member operably connected to the throttle such that a force greater than zero in one direction is exerted on the throttle by the moveable member when the moveable member is operatively controlling the throttle and a force less than zero in the opposite direction is exerted on the throttle when the throttle is controlled by the operator, and said arrangement comprising:

differentiating switch means operative to differentiate between the regulated engine idle speed throttle position and the operator selected vehicle speed throttle position, idle control switch means responsive to the direction of the force exerted in the throttle and operative to initiate positioning of the throttle at the engine idle speed pick-up position upon establishment of the second engaged condition, said idle control and differentiating switch means inter-related such that in the vehicle idle mode, with the throttle at the regulated engine idle speed position, the force is greater than zero and control switch is closed and the differentiating switch is open and, in the vehicle idle mode with the throttle at the engine idling speed pick-up position, the force is greater than zero and the control switch is closed and the differentiating switch is closed and, in the operator mode when the throttle is accelerated by the operator with the throttle at the regulated engine idle speed position, the force is less than zero and the control switch and the differentiating switch are both open and, in the operator mode when the throttle is actuated by the operator with the throttle in the engine idle speed pick-up position, the force is less than zero and the control switch is open and the differentiating switch is closed and, in the operator mode when the throttle is accelerated by the operator with the throttle at the cruise position, the force is less than zero and the control switch is open and the differentiating switch is closed and, in the cruise mode when the throttle is at the operator selected vehicle speed position, the force is greater than zero and both the control switch and the differentiating switch are closed.

27. The arrangement of claim 26 wherein the control switch and the differentiating switch are adapted such that their respective open and closed relationship to each other is reversed.

* * * * *